United States Patent [19]

Hashimoto

[11] Patent Number: 4,706,532
[45] Date of Patent: Nov. 17, 1987

[54] CUTTING EQUIPMENT WITH RULES

[76] Inventor: Osamu Hashimoto, 68, 3-chome Esaka-cho, Suita City, Osaka, Japan

[21] Appl. No.: 865,560
[22] PCT Filed: Aug. 20, 1985
[86] PCT No.: PCT/CH85/00122
§ 371 Date: Apr. 17, 1986
§ 102(e) Date: Apr. 17, 1986
[87] PCT Pub. No.: WO86/01444
PCT Pub. Date: Mar. 13, 1986

[30] Foreign Application Priority Data

Aug. 21, 1984 [JP] Japan ................................ 59-174398

[51] Int. Cl.⁴ ............................................. B23D 35/00
[52] U.S. Cl. ........................................ 83/563; 83/564; 83/479; 83/481; 83/700; 100/299; 100/918
[58] Field of Search ................. 83/563, 564, 479, 700, 83/481; 100/299, 918

[56] References Cited

U.S. PATENT DOCUMENTS 2,935,932 5/1960 Laufer .
3,503,293 3/1970 Sander .
3,559,522 1/1969 Valente .
3,638,523 2/1972 Yasuda et al. .
3,800,648 4/1974 Nishiyori .

FOREIGN PATENT DOCUMENTS 2023480 11/1970 Fed. Rep. of Germany .
2262568 9/1975 France .
2333605 7/1977 France .
0159300 9/1984 Japan .................................. 100/299
329398 6/1958 Switzerland .
1118125 6/1968 United Kingdom .................. 83/563
1496039 12/1977 United Kingdom .
1564967 4/1980 United Kingdom .
2054437 2/1981 United Kingdom .

Primary Examiner—Donald R. Schran
Attorney, Agent, or Firm—Hill, Van Santen, Steadman & Simpson

[57] ABSTRACT

The cutting apparatus with rules comprises a cutting form placed in an upper panel support (5) and a lower panel. The panel support (5) is constructed in a fashion enabling it to be withdrawn from the apparatus for purposes of replacing it. The replacement cutting form, supported in another panel support (5) previously prepared, is placed on the lower guides (19) of an adjustment table (14). The adjustment table (14) is brought up against the guides (4) which support the panel support (5) to be replaced in the machine. The latter is withdrawn from the machine so as to come to rest on the upper guides (19) of the adjustment table (14). This pivots by 180° and the replacement cutting form is pushed onto the guides 4 situated in the cutting station.

2 Claims, 8 Drawing Figures

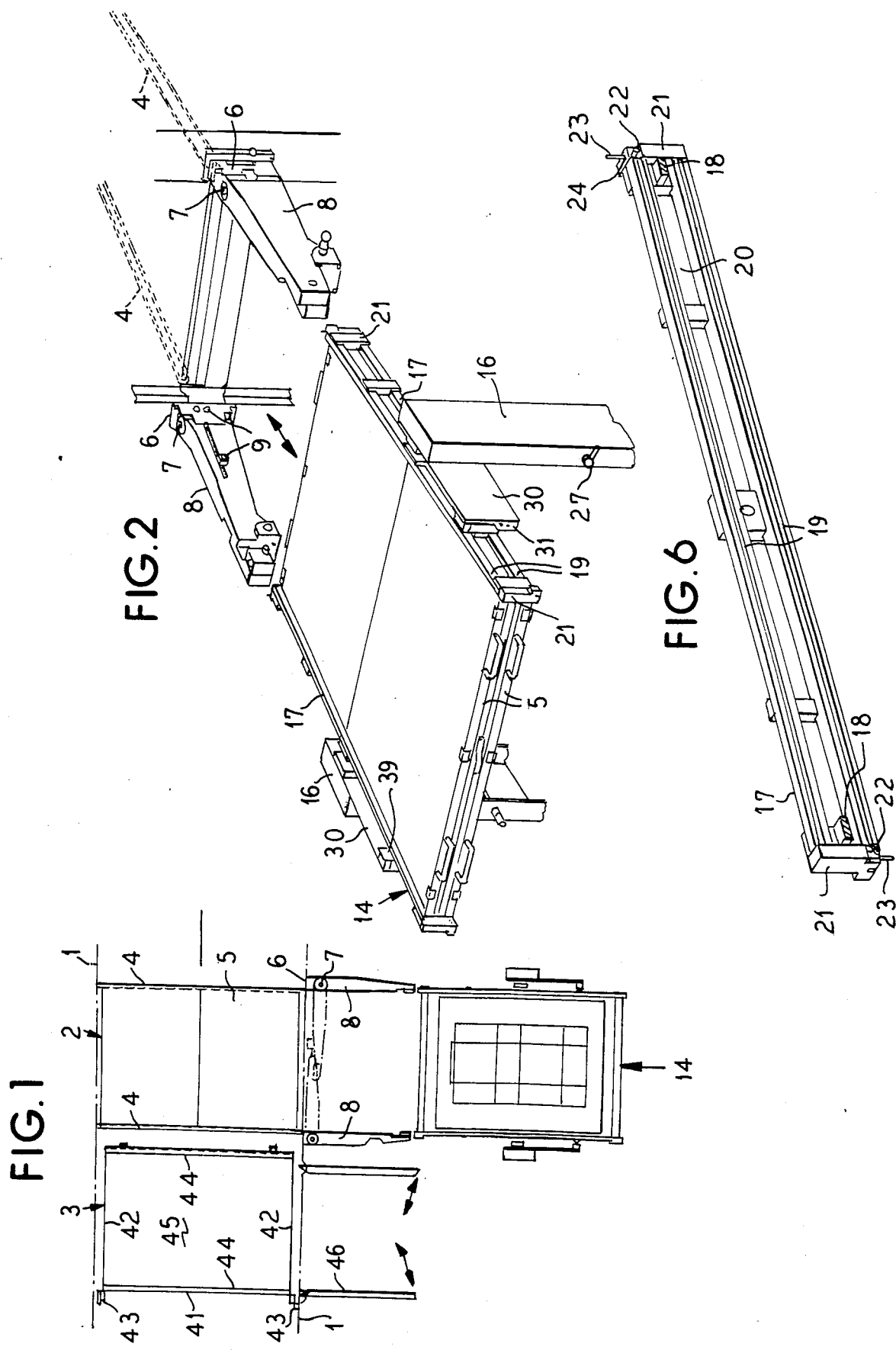

CUTTING EQUIPMENT WITH RULES

TECHNOLOGICAL FIELD

The subject matter of the present invention is a cutter apparatus with rules which allows the time utilized for setting up a new cutting job on a machine for the transformation of paper or of cardboard to be diminished.

TECHNOLOGICAL BACKGROUND

A cutting apparatus with rules generally comprises a cutting station equipped with an upper platen and with a lower platen furnished with cutting tools situated opposite one another and disposed in such fashion as to be able to come into contact with one another, for the purpose of producing box cuts by the action of the rules on a sheet of cardboard passing between said platens. It also comprises an ejector station furnished with an upper tool and with a lower tool intended, first, to remove the waste between the different cuts of the box and, second, under certain conditions, to separate the said cuts from one another. The ejection tools are provided in the form of panels or grills carrying either punches or recesses at desired locations that are realized as a function of the cutting jobs. The cutting tools and the ejection tools can be withdrawn from the apparatus through the lateral stand along guides such as rails.

The cutting station comprises a pair of pivoting arms whereof the pivot point is situated on the exterior surface of the lateral supports. On its interior surface, each arm of a pair possesses a guide groove which, when the arms are open, constitutes an extension of the guides in which, for example, the cutting tools are supported. At its end opposite the pivot, each arm is equipped with a pin intended for engagement in a bore milled in the edge of the tool that is drawn from the station. This bore is located at the center of gravity of the tool in such fashion as to permit the pivot thereof. Each arm is also furnished with a retractable pin provided for supporting the tool in a horizontal position. Such an equipping of the arms is disclosed in detail in Swiss Pat. No. 329 398. In conventional cutting apparatus with rules of the type described above, changing the tool is effected by withdrawing it between the arms which have been previously opened. The pins are introduced into their respective bores situated on the lateral faces of the tool and the latter is subsequently pivoted by 180° in such fashion that the replacement operations are facilitated. After replacement of the former tool by a new tool, the latter is again pivoted by 180°, the pins are retracted and the new tool is then introduced into the station to which it appertains. It is to be noted that these return operations are likewise necessary in order to effect the "placement" of the tool. In the type of cutting work involved, in effect, it is necessary to precisely adjust the height of each rule comprising the cutting tool. This operation is referred to as the "placement". To that end, the cutting tool is equipped with a demountable metallic plate at its surface opposite the cutter rules and it is possible to glue small pieces of paper on the surface of a sheet placed on the plate in contact with the back of the tool rules, the effect thereof being to adjust the height of the cutter rules when the plate has been fixed to the tool. In order to effect the "placement", it is obvious that the tool must be repeatedly withdrawn and introduced into the cutting station in order to monitor the quality of the cutting work. Each time that it is necessary to adjust the height of the one or of the other rules, it becomes necessary to proceed to the returning of the tool, to the demounting of the plate and to the remounting thereof. These operations, which are necessary at every change in work, obviously take a not insignificant time and force the operator to place the machine out of service. A significant decrease in production results for the cutter apparatus.

PRESENTATION OF THE INVENTION

In order to boost the total production of a cutting apparatus with rules, it is then suitable to maximally diminish the down time needed to prepare and to adjust the different tools utilized in the machine. To this end, the object of the present invention is a cutter apparatus with rules which is characterized in that it comprises an adjustment table situated at the end of the rails supporting the tools, said adjustment table comprising two lateral supports provided on each inside surface with a pair of guides situated one below the other and disposed in such fashion as to moveably support the tools to be placed in said apparatus, and in that said adjustment table is equipped with means for adjusting its position with respect to said rails supporting the tools. In the cutter apparatus which is the subject of the present description, the tool to be placed into the apparatus is previously mounted on one of the transport guides on the inside surfaces of the lateral supports of the adjustment table. During operation of the apparatus, the preparation of the tool to be placed into one of the stations of said apparatus is undertaken. At the moment when the change of tool is to be effected —the apparatus having been stopped —the adjustment table supporting the new tool is brought up against the station carrying the tool to be replaced, this tool is withdrawn along its supporting rails until it is held between the free guides of the adjustment table, the new tool is introduced by pivoting it, by adjusting the position of the adjustment table up against the supporting rails of the station, and the said tool is pushed into its working position in the apparatus.

BRIEF DESCRIPTION OF THE DRAWINGS

By way of example, the attached drawing schematically illustrates a preferred manner of executing a cutting apparatus with rules which forms the subject matter of the present invention.

FIG. 1 is a schematic view of a portion of the cutting apparatus.

FIG. 2 is a perspective view of the adjustment table.

FIG. 6 is a perspective view of the lateral support of the adjustment table.

BEST WAY OF REALIZING THE INVENTION

Figure 3:
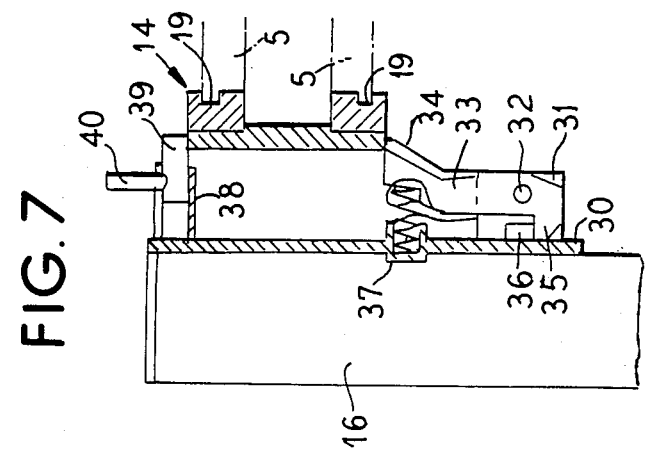
FIG. 3 is an elevational view of tte adjustment table.

Between a pair of lateral supports or frame members 1, the cutting apparatus schematically shown in FIG. 1 comprises a cutting station and an ejector station 3. The sheets to be processed move in the direction indicated by the arrow shown in FIG. 1 by means for moving a sheet through the apparatus.

The cutting station 2 comprises a pair of rails or first guides 4 situated parallel with respect to one another and extending transverse to the direction of the movement of the sheet in the apparatus. A supporting panel or panel support 5 for the tools is guided at its edges in the rails 4 and it can be withdrawn from the cutting station through an opening (not shown) introduced into the lateral support 1.

Figure 8:
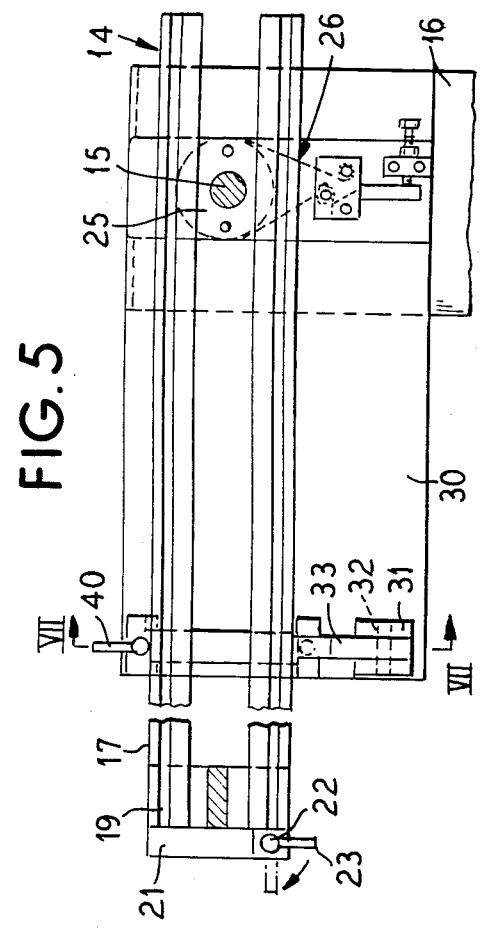
FIG. 8 is an enlarged partial view of a panel supporting the tool.

A pair of brackets 6 are fixed against the outside surface of the lateral support 1. Their position is adjacent to the end of the rails 4 (see FIG. 2). A pair of arms 8 are mounted in the brackets 6 with the assistance of pins 7. The inside surface of each arm 8 is equipped with a guide 9 composed of a plurality of small rollers. When the arms 8 are situated in their open position, the guides 9 comprise extensions for the rails 4. On the basis of this disposition, the panel support 5 can be easily displaced along the guides 9. As shown in FIG. 8, the panel support 5 comprises a bottom plate 10 to which a cutting form A is fixed in a demountable fashion with the assistance of screws 11. A pair of covers 12 or protective plates —of which only one is shown in FIG. 8 —are attached to the back of the bottom plate 10 in such fashion as to be pivotable around the axes 13. A placement sheet B is disposed between these covers 12 and the bottom plate 10. It is to this sheet that the gummed paper tapes are fixed for the purpose of adjusting the height of the rules.

As shown in FIG. 2, an adjustment table 14 is placed up against the arms 8. The supporting pins 15 (see FIG. 3) attached in pivotable fashion are introduced into the flanges 16 of a frame of the adjustable table which flanges extend vertically. The supporting pins 15 hold the adjustment table 14 at the center thereof.

As shown in FIGS. 3 through 6, the adjustment table 14 comprises a table with a pair of lateral supports 17 and a plurality of crossbars 18 provided for fixing the spacing between the lateral supports 17. The inside surface of each lateral support 17 has a pair of second guides 19 disposed parallel with respect to one another provided for supporting each side of the panel support 5 in sliding fashion. The clearances 20 are introduced between the guides 19 for the purpose of accepting the pieces carried by the flanges 16 for the purpose of assuring that the adjustment table 14 is locked in position.

The guides 19 can have the form of grooves as shown or can also be provided in the form of two rows of rollers. The first and second pairs of second guides 19 are designed in such fashion that, the adjustment table 14 being in horizontal position, the upper guide 19 is situated as the extension of the guides 9 of the arms 8 and that, when the adjustment table 14 has been repivoted by 180°, the other or second pair of second guides 19 is likewise situated as the extension of said guides 9 of the arms 8.

One of the ends of each guide 19 is terminated by a fixed piece 21 secured in the ends of each lateral support 17, whereas its other end remains open. When the guide 19 is situated in the extension of the guide 9, the open section of the guide 19 is situated close to the guide 9, whereas its closed end is situated opposite thereto. A blockage pin 22 is introduced into the fixed piece 21 in such fashion as to reemerge in the open section of the guide 19. A lever 23 connected to the blockage pin 22 is displaceable along an L-shaped groove 24 worked into the fixed piece 21. When the blockage pin 22 reemerges into the open section of the guide 19, that prevents the panel support 5 placed in the guides 19 from escaping.

Figure 5:
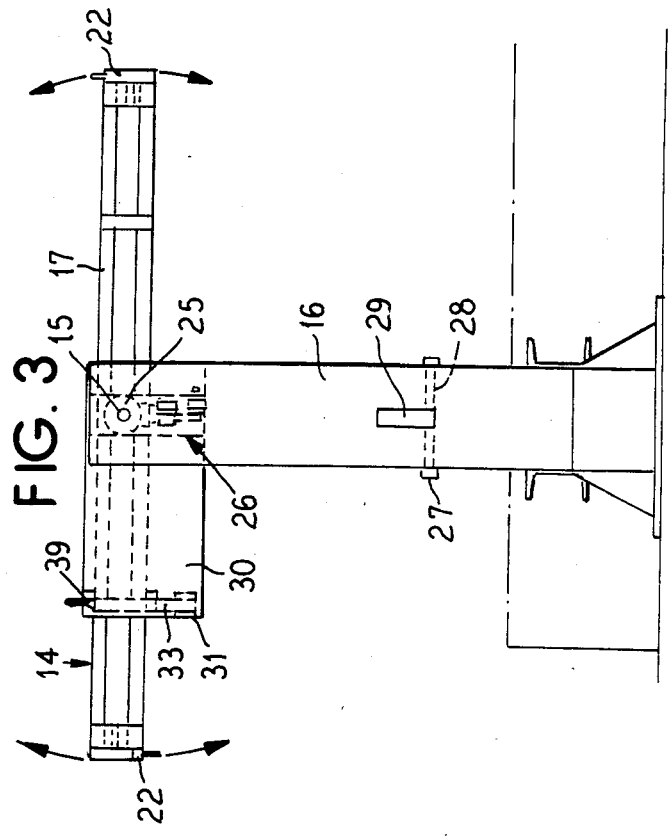
FIG. 5 is a partial, enlarged view of FIG. 3.

As shown in FIGS. 3 and 5, a band-brake 26 has been attached to the upper inside section of the flange 16. This band-brake 26 acts in such fashion as to exert its braking power on a drum 25 mounted on one of the supporting pins 15.

Figure 4:
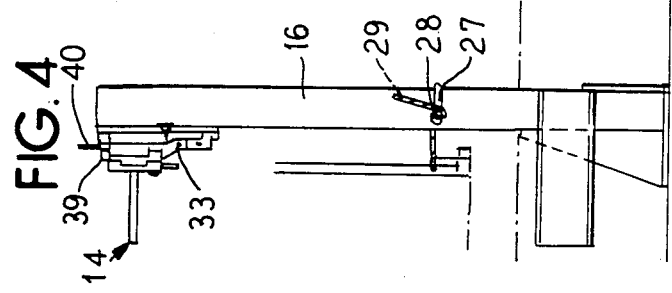
FIG. 4 is a side view of FIG. 3.

FIGS. 3 and 4 show a drive lever 27 situated at the lower section of the flange 16. This lever 27 is attached in pivotable fashion and a locking member 29 is secured to the axle 28 of said lever. When, with the assistance of the lever 27, the locking member 29 is pivoted in the direction toward the clearance 20 of the adjustment table 14, the latter remains held in a vertical position.

Figure 7:
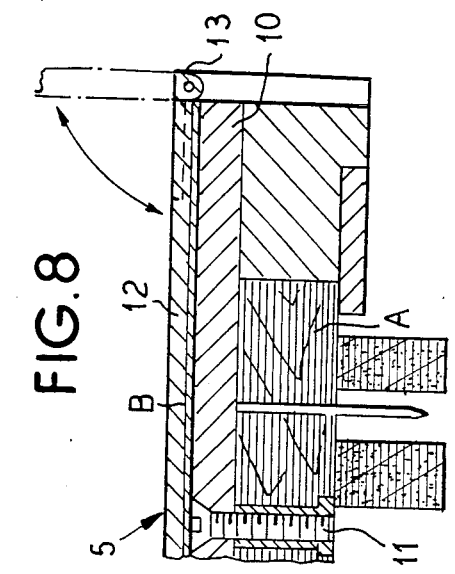
FIG. 7 is a cross-sectional view along VII—VII of FIG. 5.

The supporting panel 30 shown in FIG. 3 is fitted in such fashion as to extend laterally with respect to the upper section of the flange 16. As shown in FIG. 7, a bearing block 31 is secured to the lower inside section of the supporting panel 30. A blocking lever 33 is secured in pivotable fashion in the bearing block 31 with the assistance of an axle 32.

At its upper part, the blocking lever 33 carries an inclined plane 34, whereas its lower section exhibits a nose 35. A spring 37 is placed between the flange 16 and the locking lever 33, being placed therebetween in such fashion as to compel said lever to assume a position such that the nose 35 is engaged in a projection 36 arranged on the inside surface of the flange 16.

A guide tube 38 is situated on the upper inside section of the panel support 30. A tool holder 39 is introduced into said guide tube 38, being introduced thereinto in sliding fashion. A space is provided between the tool holder 39 and the locking lever 33 in order to accept the side of the adjustment table 14. The tool holder 39 is actuated with the assistance of a lever 40.

As shown in FIG. 1, the ejector station 3 has a rocking chassis 41 supported in pivotable fashion by the journals 43 mounted at the ends of the lateral supports 42. The rocking chassis 41 comprises a pair of slide blocks 44 and an upper panel support 45 held by the slide blocks 44 which can be withdrawn out of the lateral support 1 after the rocking chassis 41 has been pivoted. At the outside surface of the lateral support 1, the ends of the auxiliary rails 46 are held in pivotable fashion in supports in order to be able to assume an adjacent position with respect to the ends of the slide blocks 44, so that the rocking chassis 41 is capable of being withdrawn on the auxiliary rails 46.

The above-described cutting apparatus with rules is employed in the following fashion.

For the purpose of replacing the upper cutter form of the cutting station 2, the adjustment table 14 is placed in its horizontal position, its lower section being supported by the locking lever 33 (see FIG. 7). The tool holder 39 is subsequently withdrawn from the guide tube 38 in order to maintain the height of the adjustment table 14. The cutter form A previously employed is then mounted on its panel support 5 which has been previously placed on the lower guides 19 of the adjustment table 14. A placement paper B is placed between the bottom plate 10 and the covers 12. This preparation for replacing the cutter form A is carried out without the cutting station 2 being placed out of service.

Replacing the cutting form A in the machine can then be effected. The cutting station 2 is taken out of service, the arms 8 are opened, the cutting form which is to be replaced and which is mounted in its panel support 5 and held between the rails 4 is withdrawn from the station on the guides 9 of the arms 8 until it is situated on the upper guides 19 of the adjustment table 14. The blocking pins 22 situated on the open section of the upper guides 19 are introduced into their working position so that the panel support 5 is incapable of disengaging from the guides 19. The tool holder 39 (see FIG. 7) is retracted into a position allowing the rotation of the adjustment table 14. The latter is subsequently pivoted by 180° around the supporting pins 15 for introducing the new panel support 5 under the former one. The tool holder 39 is returned into a position allowing the adjustment table 14 to be kept in a horizontal plane. The blocking pins 22 of the open end of the upper guides 19 are then retracted and the new cutting form of the panel support 5 is pushed from the upper guides 19 on the rails 4 between the lateral supports 1 and that utilizing the guides 9 of the arms 8 as well. After the cutting form has been replaced in the fashion described, the cutting operation is resumed.

During the cutting operation which now commences, the former cutting form A placed in its panel support and resting on the adjustment table 14 is removed and the next cutting form is in turn placed on its panel support before being utilized.

After the replacement of a cutting form A, the adjustment table 14 is placed into its vertical position and remains in this position engaging the locking members 29 into the clearances 20 of the adjustment table 14. The vertically positioned adjustment table 14 is then not operational, although, in this execution, the adjustment table 14 is shown only as being placed proximate to the auxiliary rails 46 of the ejector station 3, this in order to proceed to the replacement of the tools of the ejector station 3. The arms 8 and the auxiliary rails 46 can be eliminated and the panel supports 5 and 45 placed on the rails 4 or, respectively, 44 can be designed in a way enabling their direct withdrawal onto the guides 19 of the adjustment table 14.

The adjustment table 14 can also be supported in a fashion differing from that shown in this execution. For example, it can be supported in a fashion enabling vertical displacement. In this case, one cutting form is mounted on a panel support on another equivalent table and said panel support, with its cutting form, is introduced into a guide set 19 of the adjustment table 14 and the panel support comprising the cutting form to be replaced is set on another set of guides 19. The adjustment table 14 is then raised or lowered until the new panel support comes to occupy the same level as the rails 4, for example, and it can be subsequently pushed into the station on said rails 4.

With the assistance of an adjustment table furnished with two guides on each lateral support, the present invention thus allows a panel support equipped with a cutting form going to be used to be supported on either the upper or lower guides. The cutting form in the machine can be easily replaced by withdrawing its panel support and inserting a new panel support equipped with a new cutting form instead. Thus, the cutting station is not taken out of service during replacement of the cutting form. This replacement is carried out in an extremely short time which improves the production rate of the cutting station.

I claim:

1. In a cutting apparatus having a lower panel, a pair of first guides positioned above said lower panel, an upper panel support being mounted in detachable fashion in said first guides, said upper panel support being provided with a cutting form with rules for coacting with the lower panel, means for moving a sheet of material between the lower panel and the upper panel support in a direction extending transverse to a direction of the first guides, the improvements comprising an adjustable table having a frame; a table having a pair of lateral supports being mounted in said frame, said lateral supports providing a first pair and a second pair of second guides extending parallel to each other with the first and second pairs being spaced apart by a predetermined amount; and means for positioning said table and lateral supports to selectively present the first pair of second guides in alignment with the first guides of said apparatus to form an extension thereof and then subsequently presenting the second pair of second guides in alignment with said first guide to form an extension thereof as the first pair are moved out of alignment.

2. In a cutting apparatus according to claim 1, wherein said means for positioning includes means for rotating the table with the pair of lateral supports through at least 180° to present each of said first and second pairs of second guides sequentially in alignment with the first guides.

* * * * *